United States Patent
Ma et al.

(10) Patent No.: US 8,334,848 B2
(45) Date of Patent: Dec. 18, 2012

(54) RESISTANCE TYPE TOUCH DISPLAY PANEL

(75) Inventors: Mei-Sheng Ma, Hsinchu (TW);
Hsin-Hung Lee, Hsinchu (TW);
Yuan-Chun Wu, Hsinchu (TW);
Kuo-Hsing Cheng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 738 days.

(21) Appl. No.: 12/129,709

(22) Filed: May 30, 2008

(65) Prior Publication Data

US 2009/0262093 A1    Oct. 22, 2009

(30) Foreign Application Priority Data

Apr. 18, 2008   (TW) ............................... 97114254 A

(51) Int. Cl.
*G06F 3/045* (2006.01)
(52) U.S. Cl. ..................................... 345/174; 178/18.05
(58) Field of Classification Search ................... 345/174, 345/173; 178/18.05
See application file for complete search history.

(56) References Cited

U.S. PATENT DOCUMENTS

| 2006/0176285 | A1* | 8/2006 | Lee et al. | 345/173 |
| 2007/0070047 | A1* | 3/2007 | Jeon et al. | 345/173 |
| 2008/0129898 | A1* | 6/2008 | Moon | 349/12 |
| 2009/0002312 | A1* | 1/2009 | Son | 345/104 |
| 2009/0200088 | A1* | 8/2009 | Chuang | 178/18.01 |

FOREIGN PATENT DOCUMENTS

| CN | 1916712 | 2/2007 |
| CN | 101109859 | 1/2008 |
| TW | 200625155 | 7/2006 |
| TW | 200710524 | 3/2007 |

OTHER PUBLICATIONS

"1st Office Action of China counterpart application", issued on Jul. 31, 2009, p. 1-p. 7.
"Office Action of Taiwan Counterpart Application", issued on Aug. 30, 2012, p. 1-p. 6.

* cited by examiner

*Primary Examiner* — Chanh Nguyen
*Assistant Examiner* — Long D Pham
(74) *Attorney, Agent, or Firm* — Jianq Chyun IP Office

(57) ABSTRACT

A resistance type touch display panel includes a first substrate and a second substrate disposed above the first substrate. The first substrate includes many scan lines and data lines defining many pixel regions on the first substrate, many pixel units and touch units. Each pixel unit is located in one of the pixel regions and electrically connected with one of the scan lines and data lines respectively. Each touch unit is electrically connected with one of the scan lines and data lines and distributed in at least two pixel regions. The second substrate includes many spacers, many touch protrusions and a common electrode covering the spacers and the touch protrusions. Each touch protrusion is located above one of the touch units and a gap is formed between the common electrode disposed on each touch protrusion and the touch unit.

30 Claims, 3 Drawing Sheets

RESISTANCE TYPE TOUCH DISPLAY PANEL

CROSS-REFERENCE TO RELATED APPLICATION

This application claims the priority benefit of Taiwan application serial no. 97114254, filed on Apr. 18, 2008. The entirety of the above-mentioned patent application is hereby incorporated by reference herein and made a part of specification.

BACKGROUND OF THE INVENTION

1. Field of the Invention

The present invention generally relates to a display panel, and more particularly to a resistance type touch display panel.

2. Description of Related Art

As information technology (IT), wireless mobile communication, information appliances being rapidly developed, many IT products are switched to use touch panels to serve as input apparatuses instead of traditional keyboards and mice, for the purpose of achieving better portability, more slimness, and more human-friendly operation.

Currently, touch panels are generally categorized into resistance type, capacitance type, optical type, acoustic wave type, and magnetic type, in which the resistance type and the capacitance type are the most popular types of touch panels. With respect to a capacitance type touch panel, it is featured with a multi-point touch which providing more human-friendly operation. As such, the capacitance type touch panels are widely welcome by the market. However, such a capacitance type touch panel can be operated only when touched by a conductive material. As such, one cannot operate a capacitance type touch panel when wearing a glove or with a non-conductive material.

As to the resistance type touch panels, users are allowed to use any medium to the touch panel for operation. As such, the resistance type touch panels are more convenient in use. Further, techniques for producing resistance type touch panels are already well established, and the production costs for the resistance type touch panels are relatively low. As such, the resistance type touch panels have a relatively high market share. In general, there are two types of circuit designs and calculation methods corresponding thereto provided for the resistance type touch panels, analog type and digital type. The analog resistance type touch panel is featured with a higher resolution, and is adapted for handwriting input operation mode. The digital resistance type touch panel can be produced with a sensing block of different sizes as desired by the clients, and therefore is more widely used in customized products.

SUMMARY OF THE INVENTION

Accordingly, the present invention is directed to a resistance type touch display panel including a plurality of touch units distributed in a plurality of pixel regions. The resistance type touch display panel has an optimal sensitivity, and an improved light transmittance.

The present invention provides a resistance type touch display panel including a first substrate and a second substrate. The first substrate includes a plurality of scan lines, a plurality of data lines, a plurality of pixel units, and a plurality of touch units. The scan lines and the data lines define a plurality of pixel regions on the first substrate. Each pixel unit is located in one of the pixel regions and electrically connected with one of the scan lines and one of the data lines respectively. Each touch unit is electrically connected to one of the scan lines and one of the data lines. Each touch unit is electrically connected with one of the scan lines and one of the data lines, and each touch unit is distributed in at least two pixel regions. The second substrate is disposed above the first substrate. The second substrate includes a plurality of spacers disposed between the first substrate and the second substrate for supporting, a plurality of touch protrusions and a common electrode. The common electrode covers the spacers and the touch protrusions. Each touch protrusion is located above one of the touch units, and a gap is formed between the common electrode disposed on each touch protrusion and the touch unit.

According to an embodiment of the present invention, each pixel unit includes a first thin-film transistor (TFT), and a pixel electrode. The first TFT is electrically connected with one of the scan lines and one of the data lines. The pixel electrode is electrically connected with the first TFT.

According to an embodiment of the present invention, each touch unit includes a touch signal readout circuit and a touch pad. The touch pad is electrically connected with the touch signal readout circuit.

According to an embodiment of the present invention, the touch signal readout circuit includes a second TFT and a posterior circuit. The second TFT is electrically connected to the touch pad. The posterior circuit is electrically connected with the second TFT, and is adapted for reading a voltage of the touch pad via the second TFT. The posterior circuit is also adapted for maintaining the voltage of the touch pad at a reference voltage after reading the voltage of the touch pad.

According to an embodiment of the present invention, the reference voltage is different from a voltage of the common electrode.

According to an embodiment of the present invention, the second substrate includes a black matrix (BM), and the spacers are disposed on the BM.

According to an embodiment of the present invention, the second substrate includes a black matrix (BM), and the common electrode covers the spacers, the touch protrusions and the BM.

According to an embodiment of the present invention, the first substrate further comprises a stage, and the common electrode is in contact with the stage.

According to an embodiment of the present invention, the common electrode which is in contact with the stage is electrically isolated from the scan lines, the data lines, the pixel units, and the touch units.

According to an embodiment of the present invention, the stage overlaps the scan line or the data line.

According to the resistance type touch display panel provided by the present invention, when a user touches the display panel, the common electrode covering the touch protrusions gets in contact with a corresponding touch pad, so as to convert the touch by the user into an electronic signal, by which a position of the touched point can be calculated. Further, the touch units of the resistance type touch display panel are distributed in a plurality of pixel regions, and therefore the resistance type touch display panel has an optimal sensitivity, and an improved light transmittance.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
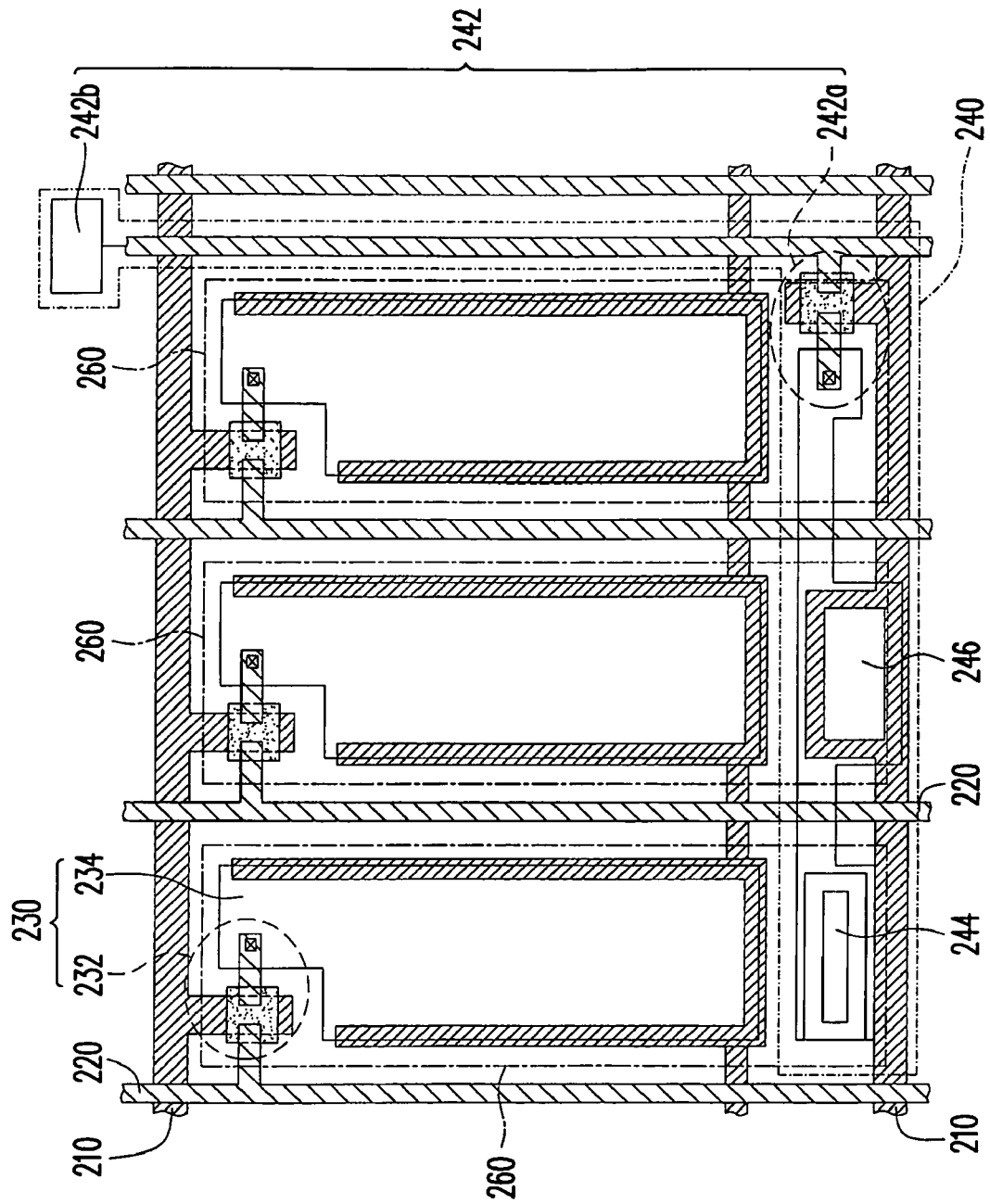
FIG. 1 is a top view of a resistance type touch display panel in an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
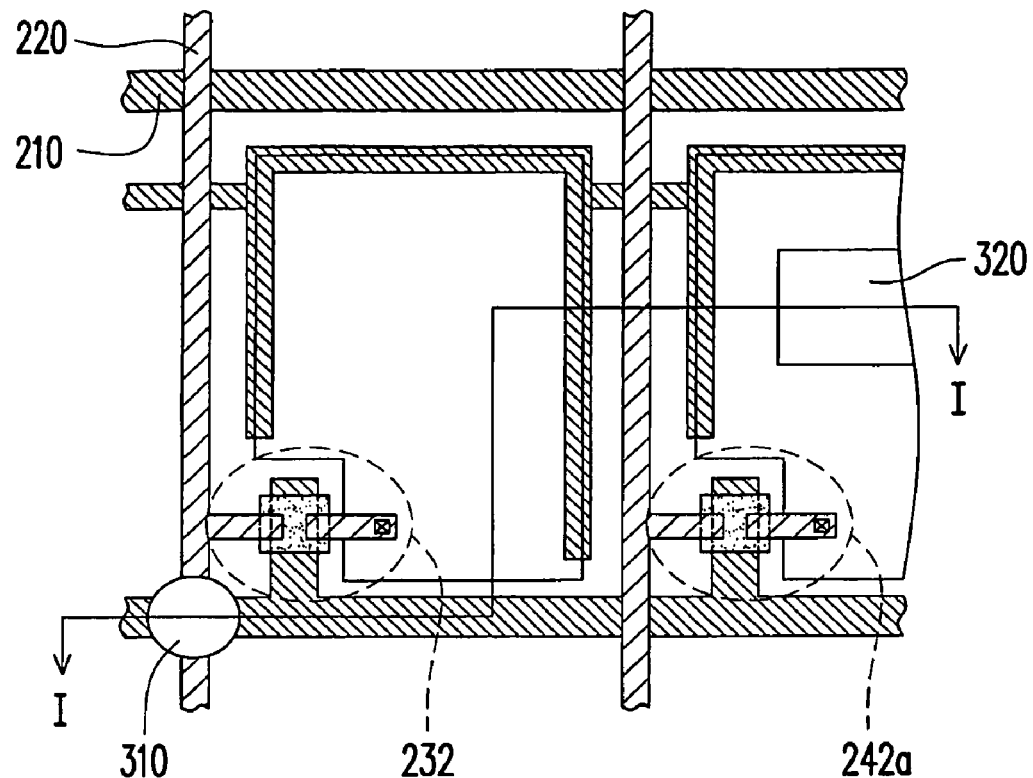
FIG. 2A is a cross-sectional view of the resistance type touch display panel alone line I-I.
Figure 2A:
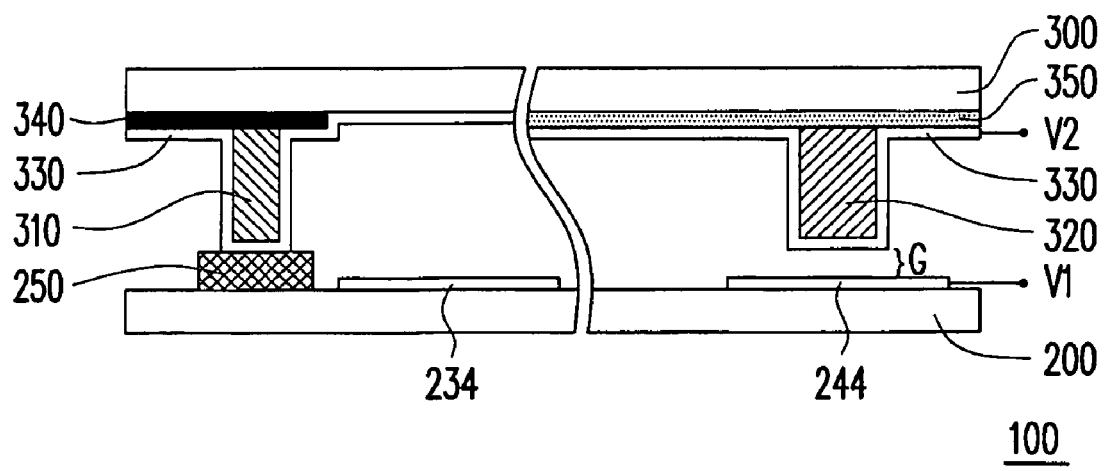

FIG. 1 is a top view of a resistance type touch display panel in an embodiment of the present invention. FIG. 2A is a cross-sectional view of the resistance type touch display panel alone line I-I. Referring to FIGS. 1 and 2A together, according to the current embodiment, the resistance type touch display panel 100 includes a first substrate 200 and a second substrate 300. The first substrate 200 includes a plurality of scan lines 210, a plurality of data lines 220, a plurality of pixel units 230 and a plurality of touch units 240. The scan lines 210 and the data lines 220 define a plurality of pixel regions 260 on the first substrate 200.

Each of the pixel units 230 is located in one of the pixel regions 260, and is electrically connected to one of the scan lines 210 and one of the data lines 220. Specifically, each of the pixel units 230 includes a first thin-film transistor (TFT) 232 and a pixel electrode 234. The first TFT 232 is electrically connected with one of the scan lines 210 and one of the data lines 220. The pixel electrode 234 is electrically connected with the first TFT 232.

Each touch unit 240 is electrically connected to one of the scan lines 210 and one of the data lines 220 respectively. Each touch unit 240 is distributed in at least two pixel regions 260 (as shown in FIG. 1, the touch unit 240 is exemplified as being distributed in three pixel regions 260). Because the touch unit 240 is distributed in multiple pixel regions 260, the resistance type touch display panel 100 can achieve a better sensitivity, and as well as a higher aperture ratio.

Specifically, each touch unit 240 includes a touch signal readout circuit 242 and a touch pad 244. The touch pad 244 is electrically connected with the touch signal readout circuit 242. The touch signal readout circuit 242 includes a second TFT 242a and a posterior circuit 242b. The second TFT 242a is electrically connected to the touch pad 244. The posterior circuit 242b is electrically connected with the second TFT 242a, and is adapted for reading a voltage of the touch pad 244 via the second TFT 242a. The posterior circuit 242b is also adapted for maintaining the voltage of the touch pad 244 at a reference voltage V1 after reading the voltage of the touch pad 244.

Specifically, according to the current embodiment, each of the touch units 240 includes a storage capacitor 246. The storage capacitor 246 is disposed between the second TFT 242a and the touch pad 244, and is formed on the scan line 210. In such a way, the storage capacitor 246 enables the pixel unit 230 with a memorizing function. Furthermore, a storage capacitor 246 having a greater capacitance enables the pixel unit 230 with a better memorizing function and sustaining function.

Referring to FIGS. 1 and 2A again, according to the current embodiment, the second substrate 300 is disposed above the first substrate 200. The second substrate 300 includes a plurality of spacers 310 disposed between the first substrate 200 and the second substrate 300 for supporting a plurality of touch protrusions 320 and a common electrode 330. The common electrode 330 covers the spacers 310 and the touch protrusions 320. The reference voltage V1 is different from the voltage V2 of the common electrode 330. Each touch protrusion 320 is located correspondingly above one of the touch units 240 respectively, and a gap G is formed between the common electrode 330 disposed on each touch protrusion 320 and the touch unit 240.

Generally, the spacers 310 are disposed to keep the first substrate 200 away from the second substrate 300 for a certain distance. The spacers 310 for example can be stick type spacers, ball type spacers, or post type spacers. As shown in FIG. 2A, according to the current embodiment, the spacers 310 employed hereby are post type spacers.

Further, according to the current embodiment, the second substrate 300 includes a black matrix (BM) 340, and the spacers 310 are located on the BM 340, and the common electrode 330 covers the spacers 310, the touch protrusions 320 and the BM 340. It should be noted that in order to achieve color displaying, the second substrate 300 further includes a plurality of color filter films 350 disposed thereon. The color filter films 350 for example can be red, green, blue color filter films, or the like. In the current embodiment, the touch protrusion 320 as shown in FIG. 2A is disposed on the color filter films 350.

Further, the first substrate 200 according to the current embodiment includes a stage 250, and the common electrode 330 covering the spacers 310 is in contact with the stage 250. The common electrode 330 which is in contact with the stage 250 is electrically isolated from the scan lines 210, the data lines 220, the pixel units 230 and the touch units 240.

Figure 2B:
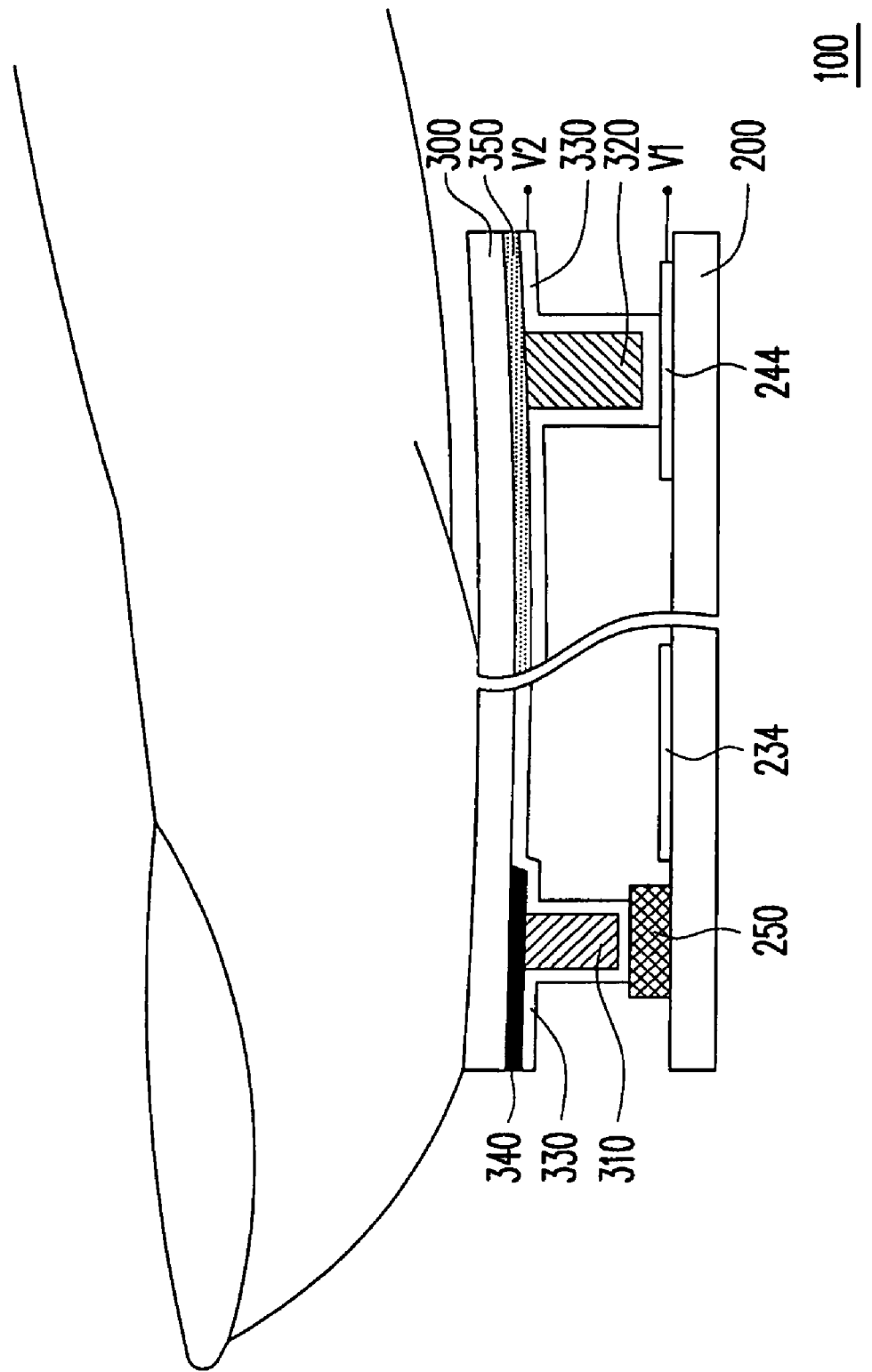
FIG. 2B is a schematic diagram describing the situation when a finger touches the resistance type touch display panel.

Briefly, when a user touches or presses the resistance type touch display panel 100, the spacers 310 are deformed because of a force applied by the touch. Therefore, the distance from the first substrate 200 to the second substrate 300 is shortened, so that the common electrode 330 covering the touch protrusion 320 will get in contact with the corresponding touch pad 244, and thus changing a voltage of the touch pad 244. In more detail, the voltage of the touch pad 244 changes from the reference voltage V1 to the voltage V2 of the common electrode 330. In such a way, the touch of the user is converted into an electronic signal, by which a position of the touched point can be calculated as shown in FIG. 2B.

Further, the touch units 240 of the resistance type touch display panel 100 are distributed in a plurality of pixel regions 260. As such, there are more touch units 240 in a unit area. In such a way, when the user touches the resistance type touch display panel 100, the common electrode 330 covering the touch protrusions 320 will get in contact with more corresponding touch pads 244. And therefore, such a resistance type touch display panel 100 has an optimal sensitivity. Further, the common electrode 330 is in contact with the stage 250. For example, at least one of the stage 250 and the spacer 310 can be disposed above the corresponding scan line 210, the corresponding data line 220 or the corresponding storage capacitor 246. In other words, at least one of the stage 250 and the spacer 310 overlaps the corresponding scan line 210, data line 220 or the storage capacitor 246. In such a way, layout spaces can be saved, and the aperture ratio thereof can be improved. It should be further noted that in other embodiments, the stage 250 can be configured with a multi-layer structure including an upper layer and a lower layer. The lower layer is electrically connected with the corresponding scan line 210, the corresponding data line 220, or the correspondingly storage capacitor 246. The upper layer is an insulation layer disposed on the lower layer, and in contact with the common electrode 330.

It should be noted that the first substrate 200 and the second substrate 300 can be glass substrate, quartz substrates or plastic substrates. The first TFT 232 and the second TFT 242a for example can be amorphous silicon TFTs, low temperature poly-silicon (LTPS) TFTs, organosilicon TFTs or other TFTs. The pixel electrode 234 can be made of an indium tin oxide (ITO) material, an indium zinc oxide (IZO) material, or other transparent conductive materials.

In summary, the present invention provides a resistance type touch display panel having the advantages:

1. The touch units of the resistance type touch display panel are distributed in a plurality of pixel regions, and therefore the resistance type touch display panel has an optimal sensitivity; and
2. The touch units of the resistance type touch display panel are distributed in a plurality of pixel regions, and therefore the resistance type touch display panel has an improved light transmittance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A resistance type touch display panel, comprising:
   a first substrate comprising a plurality of scan lines, a plurality of data lines, a plurality of pixel units and a plurality of resistance type touch units disposed thereon, wherein the scan lines and the data lines define a plurality of pixel regions on the first substrate, each pixel unit is located in one of the pixel regions and electrically connected with one of the scan lines and one of the data lines respectively, each resistance type touch unit is electrically connected with one of the scan lines and one of the data lines; and each resistance type touch unit is distributed in at least two pixel regions, and each of the resistance type touch units comprises:
   a touch signal readout circuit, comprising:
      a thin-film transistor (TFT); and
      a posterior circuit electrically connected with the TFT;
   a touch pad electrically connected with the touch signal readout circuit, the TFT being electrically connected to the touch pad, wherein the posterior circuit is adapted for reading a voltage of the touch pad via the TFT, and the TFT is used for maintaining the voltage of the touch pad at a reference voltage after reading the voltage of the touch pad;
   a storage capacitor disposed between the TFT and the touch pad, wherein the storage capacitor, the TFT, and the touch pad are located in different pixel regions, respectively; and
   a second substrate disposed above the first substrate, wherein the second substrate comprises a plurality of spacers, a plurality of touch protrusions and a common electrode formed thereon, and wherein the common electrode covers the spacers and the touch protrusions, each touch protrusion is located above one of the resistance type touch units, and a gap is formed between the common electrode disposed on each touch protrusion and the resistance type touch unit.

2. The resistance type touch display panel according to claim 1, where in each of the pixel units comprises:
   a first TFT electrically connected with one of the scan lines and one of the data lines; and
   a pixel electrode electrically connected with the first TFT.

3. The resistance type touch display panel according to claim 1, wherein the reference voltage is different from a voltage of the common electrode.

4. The resistance type touch display panel according to claim 1, wherein the second substrate includes a black matrix (BM), and the spacers are disposed on the BM.

5. The resistance type touch display panel according to claim 1, wherein the second substrate includes a black matrix (BM), and the common electrode covers the spacers, the touch protrusions and the BM.

6. The resistance type touch display panel according to claim 1, wherein the first substrate further comprises a stage, and the common electrode is in contact with the stage.

7. The resistance type touch display panel according to claim 6, wherein the common electrode which is in contact with the stage is electrically isolated from the scan lines, the data lines, the pixel units and the resistance type touch units.

8. The resistance type touch display panel according to claim 6, wherein the stage overlaps the scan line or the data line.

9. A resistance type touch display panel, comprising:
   a first substrate comprising a plurality of scan lines, a plurality of data lines, a plurality of pixel units and a plurality of touch units disposed thereon, wherein the scan lines and the data lines define a plurality of pixel regions on the first substrate, each pixel unit is located in one of the pixel regions and electrically connected with one of the scan lines and one of the data lines respectively, each touch unit is electrically connected with one of the scan lines and one of the data lines, and the each touch unit comprises:
   a touch signal readout circuit, comprising:
      a thin-film transistor (TFT); and
      a posterior circuit electrically connected with the TFT;
   a touch pad electrically connected with the touch signal readout circuit; the TFT being electrically connected to the touch pad, wherein the posterior circuit is adapted for reading a voltage of the touch pad via the TFT, and the TFT is used for maintain the voltage of the touch pad at a reference voltage after reading the voltage of the touch pad;
   a storage capacitor, disposed between the TFT and the touch pad, wherein the TFT, the storage capacitor and the touch pad are in different pixel regions respectively; and
   a second substrate disposed above the first substrate, wherein the second substrate comprises a plurality of spacers, a plurality of touch protrusions and a common electrode formed thereon, and wherein the common electrode covers the spacers and the touch protrusions, each touch protrusion is located above one of the touch units, and a gap is formed between the common electrode disposed on each touch protrusion and the touch unit.

10. The resistance type touch display panel according to claim 9, wherein the reference voltage is different from a voltage of the common electrode.

11. The resistance type touch display panel according to claim 9, wherein the second substrate further comprises a black matrix (BM), and the spacers are disposed on the BM.

12. The resistance type touch display panel according to claim 9, wherein the second substrate further comprises a black matrix (BM), and the common electrode covers the spacers, the touch protrusions and the BM.

13. The resistance type touch display panel according to claim 9, wherein the first substrate further comprises a stage, and the common electrode is in contact with the stage.

14. The resistance type touch display panel according to claim 13, wherein the common electrode which is in contact with the stage is electrically isolated from the scan lines, the data lines, the pixel units and the touch units.

15. The resistance type touch display panel according to claim 13, wherein the stage overlaps the scan line or the data line.

16. A resistance type touch display panel, comprising:
a first substrate comprising a plurality of scan lines, a plurality of data lines, a plurality of pixel units and a plurality of touch units disposed thereon, wherein the scan lines and the data lines define a plurality of pixel regions on the first substrate, each pixel unit is located in one of the pixel regions and electrically connected with one of the scan lines and one of the data lines respectively, each touch unit is electrically connected with one of the scan lines and one of the data lines, and the each touch unit comprises:
a touch signal readout circuit, comprising:
a single thin-film transistor (TFT); and
a posterior circuit electrically connected with the single TFT;
a touch pad electrically connected with the touch signal readout circuit, the single TFT being electrically connected to the touch pad, wherein the posterior circuit is adapted for reading a voltage of the touch pad via the single TFT, and the single TFT is used for maintaining the voltage of the touch pad at a reference voltage after reading the voltage of the touch pad;
a storage capacitor disposed between the single TFT and the touch pad, wherein the storage capacitor, the single TFT, and the touch pad are located in different pixel regions, respectively; and
a second substrate disposed above the first substrate, wherein the second substrate comprises a plurality of spacers, a plurality of touch protrusions and a common electrode formed thereon, and wherein the common electrode covers the spacers and the touch protrusions, each touch protrusion is located above one of the touch units, a gap is formed between the common electrode disposed on each touch protrusion and the touch unit.

17. The resistance type touch display panel according to claim 16, wherein the common electrode is adapted to get in contact with the corresponding touch pad.

18. The resistance type touch display panel according to claim 16, wherein the reference voltage is different from a voltage of the common electrode.

19. The resistance type touch display panel according to claim 16, wherein the second substrate further comprises a black matrix (BM), and the spacers are disposed on the BM.

20. The resistance type touch display panel according to claim 16, wherein the second substrate further comprises a black matrix (BM), and the common electrode covers the spacers, the touch protrusions and the BM.

21. The resistance type touch display panel according to claim 16, wherein the first substrate further comprises a stage, and the common electrode is in contact with the stage.

22. The resistance type touch display panel according to claim 21, wherein the common electrode which is in contact with the stage is electrically isolated from the scan lines, the data lines, the pixel units and the touch units.

23. The resistance type touch display panel according to claim 21, wherein the stage overlaps the scan line or the data line.

24. A resistance type touch display panel, comprising:
a first substrate comprising a plurality of scan lines, a plurality of data lines, a plurality of pixel units and a plurality of touch units disposed thereon, wherein the scan lines and the data lines define a plurality of pixel regions on the first substrate, each pixel unit is located in one of the pixel regions and electrically connected with one of the scan lines and one of the data lines respectively, each touch unit is electrically connected with one of the scan lines and one of the data lines; and each touch unit is distributed in at least two pixel regions, and each of the touch units comprises:
a touch signal readout circuit, comprising:
a thin-film transistor (TFT); and
a posterior circuit electrically connected with the TFT;
a touch pad electrically connected with the touch signal readout circuit, the TFT being electrically connected to the touch pad, wherein the posterior circuit is adapted for reading a voltage of the touch pad via the TFT, and the TFT is used for maintaining the voltage of the touch pad at a reference voltage after reading the voltage of the touch pad;
a storage capacitor, disposed between the TFT and the touch pad, wherein the storage capacitor, the TFT and the touch pad are located in different pixel regions, respectively; and
a second substrate disposed above the first substrate, wherein the second substrate comprises a plurality of spacers, a plurality of touch protrusions and a common electrode formed thereon, and wherein the common electrode covers the spacers and the touch protrusions, each touch protrusion is located above one of the touch units, and a gap is formed between the common electrode disposed on each touch protrusion and the touch unit.

25. The resistance type touch display panel according to claim 24, wherein the reference voltage is different from a voltage of the common electrode.

26. The resistance type touch display panel according to claim 24, wherein the second substrate includes a black matrix (BM), and the spacers are disposed on the BM.

27. The resistance type touch display panel according to claim 24, wherein the second substrate includes a black matrix (BM), and the common electrode covers the spacers, the touch protrusions and the BM.

28. The resistance type touch display panel according to claim 24, wherein the first substrate further comprises a stage, and the common electrode is in contact with the stage.

29. The resistance type touch display panel according to claim 28, wherein the common electrode which is in contact with the stage is electrically isolated from the scan lines, the data lines, the pixel units and the touch units.

30. The resistance type touch display panel according to claim 28, wherein the stage overlaps the scan line or the data line.

* * * * *